(12) United States Patent
Matsumoto

(10) Patent No.: US 8,726,003 B2
(45) Date of Patent: May 13, 2014

(54) RECONFIGURABLE OPERATION APPARATUS, DATA COMPRESSION APPARATUS, RECONFIGURABLE OPERATION METHOD AND COMPUTER-READABLE MEDIUM

(75) Inventor: Daisuke Matsumoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 472 days.

(21) Appl. No.: 13/028,718

(22) Filed: Feb. 16, 2011

(65) Prior Publication Data

US 2012/0054484 A1 Mar. 1, 2012

(30) Foreign Application Priority Data

Aug. 25, 2010 (JP) .................................. 2010-188031

(51) Int. Cl.
*G06F 9/00* (2006.01)
*G06F 9/24* (2006.01)
*H03M 7/48* (2006.01)

(52) U.S. Cl.
USPC .. 713/100; 713/1; 713/2; 341/59; 358/426.13

(58) Field of Classification Search
None
See application file for complete search history.

(56) References Cited

U.S. PATENT DOCUMENTS

| | | | |
|---|---|---|---|
| 2002/0075532 A1* | 6/2002 | Shiraishi | 358/539 |
| 2005/0110518 A1* | 5/2005 | Kanno et al. | 326/39 |
| 2009/0089626 A1* | 4/2009 | Gotch et al. | 714/45 |

FOREIGN PATENT DOCUMENTS

| | | |
|---|---|---|
| JP | A-5-268485 | 10/1993 |
| JP | A-8-65171 | 3/1996 |
| JP | A-2000-261675 | 9/2000 |
| JP | A-2001-102937 | 4/2001 |

* cited by examiner

*Primary Examiner* — Fahmida Rahman
(74) *Attorney, Agent, or Firm* — Oliff PLC

(57) ABSTRACT

A reconfigurable operation apparatus includes a reconfigurable circuit, a storage unit and a control unit. The reconfigurable circuit has a plurality of small circuits and reconfigures a circuit using the small circuit selected from the plurality of small circuits based on recorded circuit information. The storage unit stores first and second circuit information which corresponds to first and second compression circuits, respectively. The control unit reconfigures the reconfigurable circuit into the first or second compression circuit by recording the first or second circuit information in the reconfigurable circuit in accordance with an input data string.

3 Claims, 11 Drawing Sheets

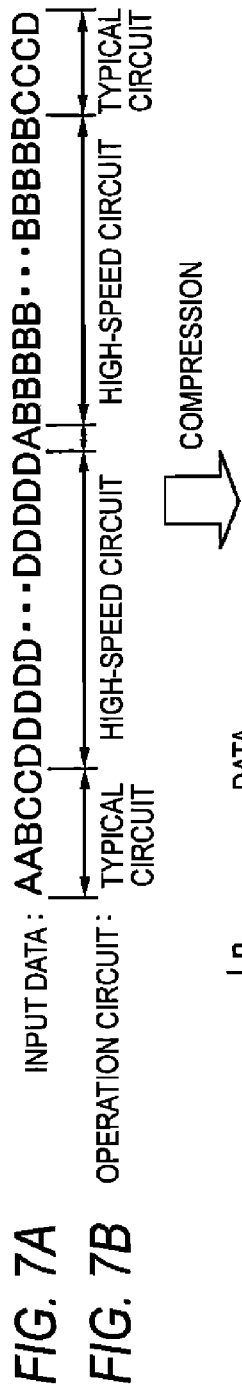

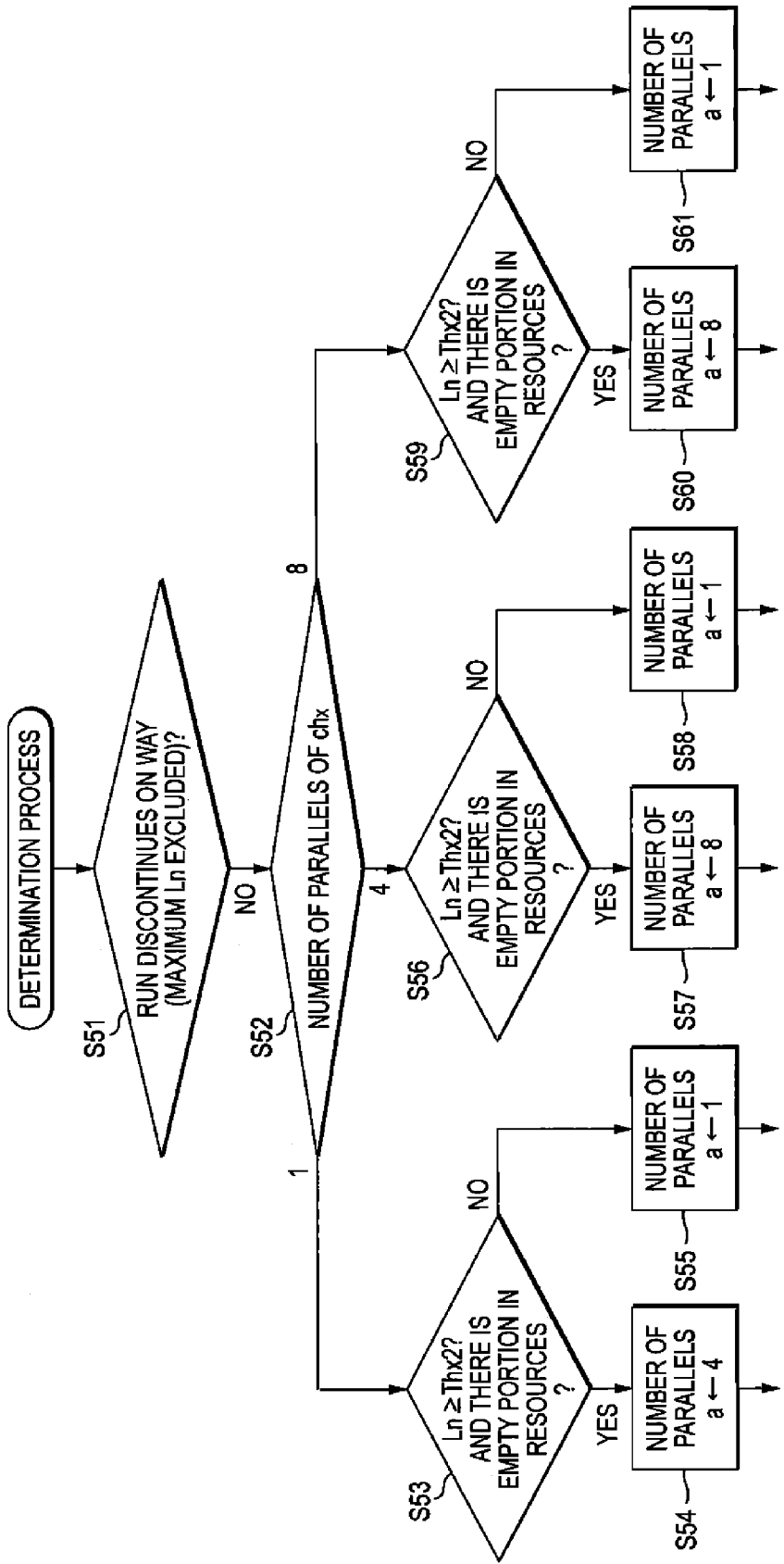

RECONFIGURABLE OPERATION APPARATUS, DATA COMPRESSION APPARATUS, RECONFIGURABLE OPERATION METHOD AND COMPUTER-READABLE MEDIUM

CROSS-REFERENCE TO RELATED APPLICATION

This application is based on and claims priority under 35 USC 119 from Japanese Patent Application No. 2010-188031 filed on Aug. 25, 2010.

BACKGROUND

1. Technical Field

The present invention relates to a reconfigurable operation apparatus, a data compression apparatus, a reconfigurable operation method and a computer-readable medium.

2. Related Art

Although run-length compression is a simple algorithm, it has been generally used as an image data compression method since it well matches with image data. The run-length compression is a method of replacing sequential portions (runs) having the same value by length (run-length) information.

SUMMARY

[1] According to an aspect of the invention, a reconfigurable operation apparatus includes a reconfigurable circuit, a storage unit and a control unit. The reconfigurable circuit has a plurality of small circuits and reconfigures a circuit using the small circuit selected from the plurality of small circuits based on recorded circuit information. The storage unit stores first and second circuit information which corresponds to first and second compression circuits, respectively. The control unit reconfigures the reconfigurable circuit into the first or second compression circuit by recording the first or second circuit information in the reconfigurable circuit in accordance with an input data string.

BRIEF DESCRIPTION OF THE DRAWINGS

Exemplary embodiments of the invention will be described in detail based on the following figures, wherein:

FIGS. 7A to 7E illustrate detailed examples of a compression operation, in which FIG. 7A is a diagram illustrating an example of input data, FIG. 7B is a diagram illustrating an operation circuit, FIG. 7C is a diagram illustrating an example of output data, FIG. 7D is a diagram schematically illustrating a typical circuit, and FIG. 7E is a diagram schematically illustrating a high-speed circuit;

FIG. 10 is a flowchart illustrating an example of an operation of a second embodiment of the invention.

DETAILED DESCRIPTION

Figure 1:
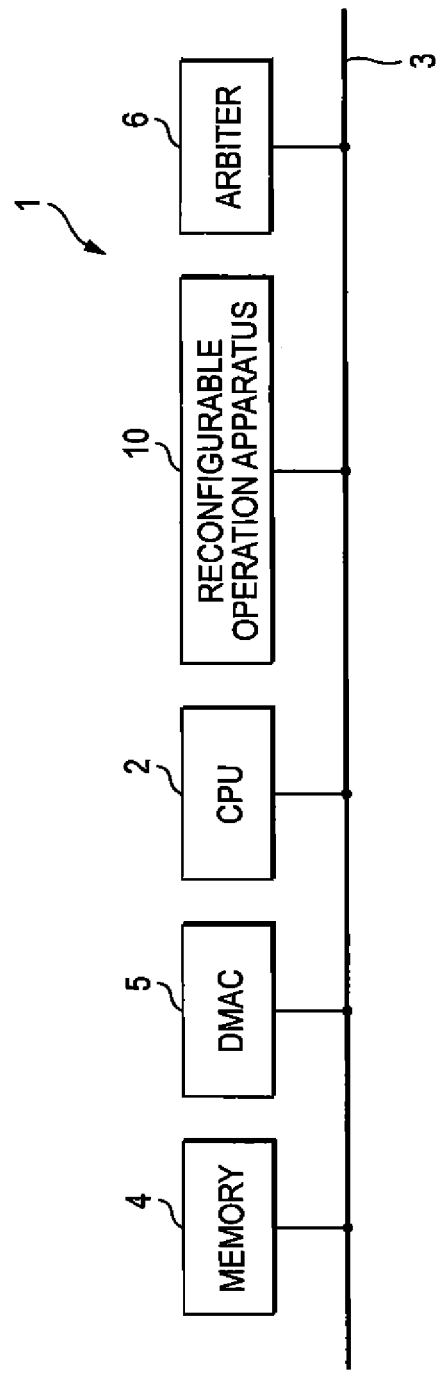
FIG. 1 is a front view illustrating the schematic configuration of a date compression apparatus according to a first embodiment of the invention.

FIG. 1 is a front view illustrating a configuration example of a date compression apparatus according to a first embodiment of the invention.

This data compression apparatus 1 includes a CUP 2 controlling respective units of the data compression apparatus 1, a reconfigurable operation apparatus 10, a memory 4, a DMAC (Direct Memory Access Controller) 5, and an arbiter 6, which are connected to the CPU 2 via a bus 3.

The data compression apparatus 1 may be applied, for example, in the case of transmitting data within an image forming apparatus, such as compression and outputting of image data read by an image reading unit to an image processing unit, and in the case of compressing and transmitting data between apparatuses, such as between a PC (Personal Computer) and a multifunctional apparatus having multiple functions, such as a printer, a copy machine, a printer, or the like, or an image forming apparatus such as a facsimile machine or the like. In this case, the application examples of the data compression apparatus 1 are not limited to those as described above.

The memory 4 stores data before compression and data obtained by compressing the data before compression by a method according to this embodiment.

The DMAC 5 directly controls DMA transmission of data between the memory 4 and the reconfigurable operation apparatus 10 without passing through a process by the CPU 2.

The arbiter 6 functions as an arbitration unit for performing use right arbitration of the bus 3 when the DMAC 5 or the like performs data transmission.

Figure 2:
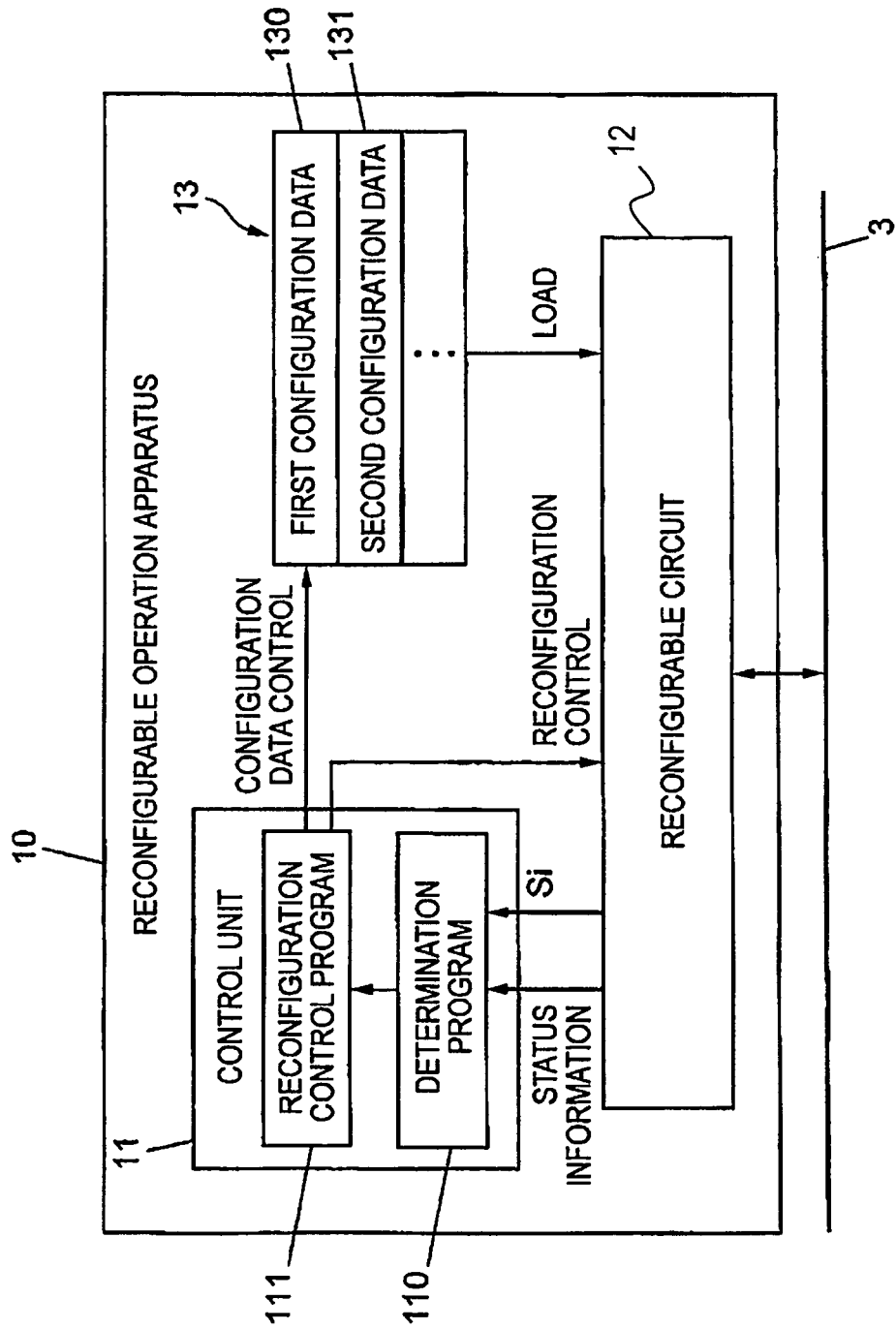
FIG. 2 is a block diagram illustrating an example of the configuration of a reconfigurable operation apparatus.

FIG. 2 is a block diagram illustrating an example of the configuration of a reconfigurable operation apparatus 10. The reconfigurable operation apparatus 10 includes a control unit 11 controlling respective units of the reconfigurable operation apparatus 10 based on a determination program 110 and a reconfiguration control program 111, a reconfigurable circuit 12 capable of reconfiguring a circuit, and a configuration data storage unit 13 as a storage unit for storing circuit information.

The reconfigurable circuit 12 is also called a DRP (Dynamically Reconfigurable Processor). The reconfigurable circuit 12 includes a plurality of small circuits, such as an ALU (Arithmetic Logic Unit), a RAM (Random Access Memory), and the like, and can reconfigure a circuit using the small circuit selected from the plurality of small circuits based on the recorded circuit information.

The configuration data storage unit 13 stores first configuration data 130 for reconfiguring the reconfigurable circuit 12 into a typical circuit and second configuration data 131 for reconfiguring the reconfigurable circuit 12 into a high-speed circuit. In this case, the configuration data storage unit 13 may further store configuration data for reconfiguring the reconfigurable circuit 12 into another circuit except for the typical circuit and the high-speed circuit. The first configuration data 130 is an example of first circuit information, and the second configuration data 131 is an example of second circuit information. Also, the typical circuit is an example of a first compression circuit, and the high-speed circuit is an example of a second compression circuit.

The control unit 11 performs a process based on the determination program 110 and the reconfiguration control program 111. The control unit 11 determines status information obtained by the reconfigurable circuit 12 by the determination program 110, and outputs determination information that is the result of determination to the reconfiguration control program 111. Also, the control unit 11 is configured to perform a reconfiguration control of the reconfigurable circuit 12 by the reconfiguration control program 111 based on the determination information output by the determination program 110, and to perform a configuration control of the configuration data storage unit 13.

The determination program 110 is configured to monitor the status information from the reconfigurable circuit 12, and if the run length included in the status information is equal to or larger than a threshold value (for example, 4), the determination program 110 selects the high-speed circuit, while if the run length is smaller than the threshold value, the determination program 110 selects the typical circuit. The determination program 110 notifies the reconfiguration control program 111 of information on the selected circuit.

If the determination program 110 notifies that the typical circuit has been selected, the reconfiguration control program 111 reconfigures the reconfigurable circuit 12 into the typical circuit 12a by loading the first configuration data 130 from the configuration data storage unit 13 on the reconfigurable circuit 12. Also, if the determination program 110 notifies that the high-speed circuit has been selected, the reconfiguration control program 111 reconfigures the reconfigurable circuit 12 into the high-speed circuit 12b by loading the second configuration data 131 from the configuration data storage unit 13 on the reconfigurable circuit 12.

Figure 3:
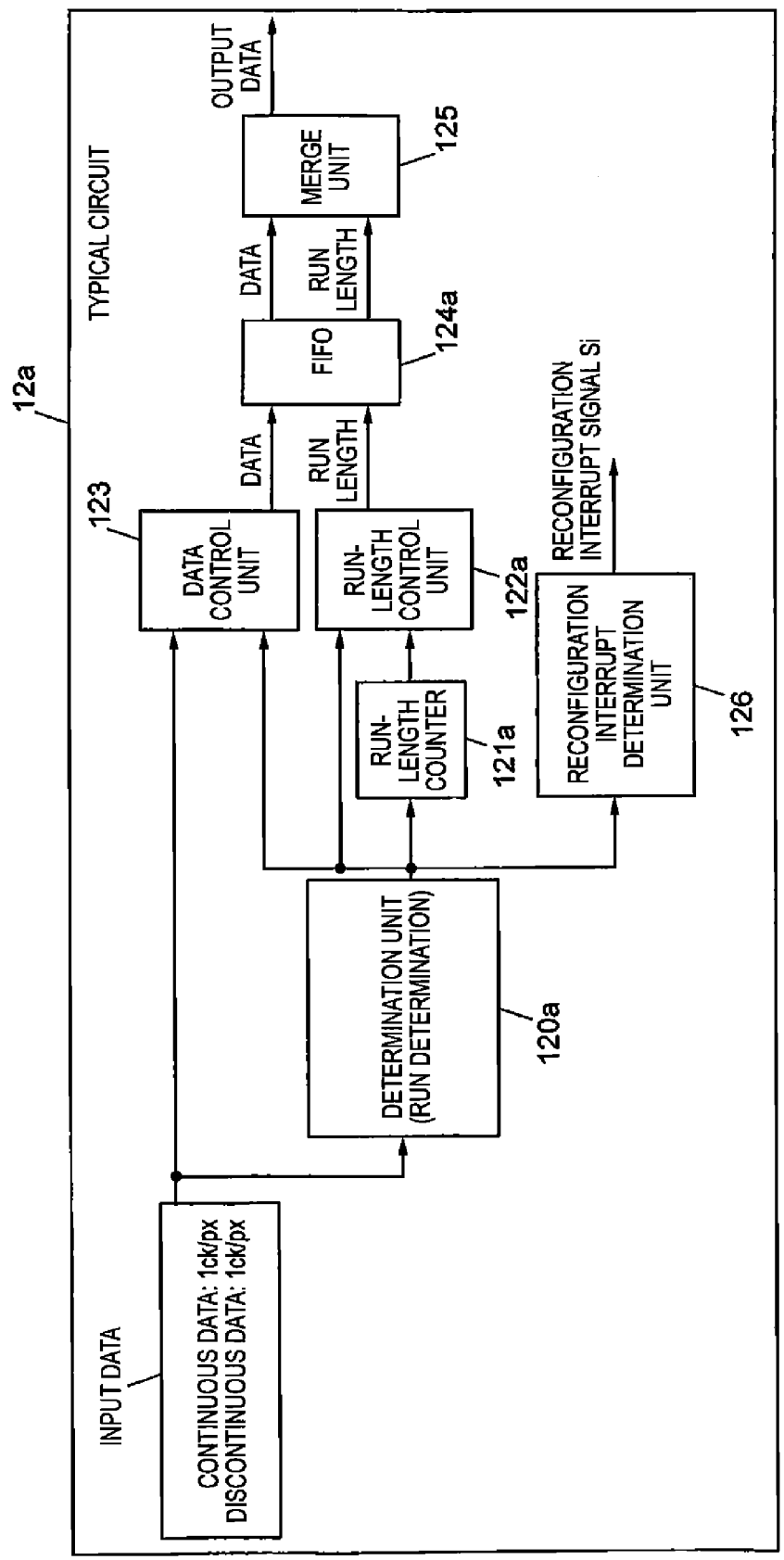
FIG. 3 is a block diagram illustrating an example of the configuration of a typical circuit.

FIG. 3 is a block diagram illustrating an example of the configuration of a typical circuit. By loading the first configuration data 130 on the reconfigurable circuit 12, the reconfigurable circuit 12 is reconfigured into the typical circuit 12a as illustrated in FIG. 3.

The typical circuit 12a is a circuit that performs a run-length compression of the input data string, and includes a determination unit 120a, a run-length counter 121a, a run-length control unit 122a, a data control unit 123, a FIFO unit 124a, a merge unit 125, and a reconfiguration interrupt determination unit 126.

The determination unit 120a, for example, receives an input of data transmitted by the DMAC 5 from the memory 4. Also, the determination unit 120a determines whether a portion (run), in which data having the same value as that of the input data continues, exists. The input data may be, for example, image data which has two values or multiple values for white and black or multiple values for plural kinds of colors (for example, red, green, and blue). In this case, the input data is not limited to the image data.

The run-length counter 121a counts runs that are determined by the determination unit 120a, and outputs the length of runs (run length Ln).

The run-length control unit 122a outputs the run length that is output from the run-length counter 121a to the FIFO unit 24a by pixels. Also, the run-length control unit 122a generates status information which includes circuit information that indicates the run length and whether the current reconfigurable circuit 12 is the typical circuit 12a or the high-speed circuit 12b, and outputs the status information to the determination program 110.

The data control unit 123 outputs the input data to the FIFO unit 124 by pixels.

The FIFO unit 124a buffers the data from the data control unit 123 and the run length from the run-length control unit 122a, and delays the data and the run length as long as the time that is required for processing of the merge unit 125 to output the delayed data and run length to the merge unit 125.

The merge unit 125 generates output data by combining the run and the data. For example, the output data is transmitted by the DMAC 5 to the memory 4.

If an end interrupt is generated by the CPU 2 or the like, the reconfiguration interrupt determination unit 126 outputs an end interrupt signal Si to the control unit 11.

Figure 4:
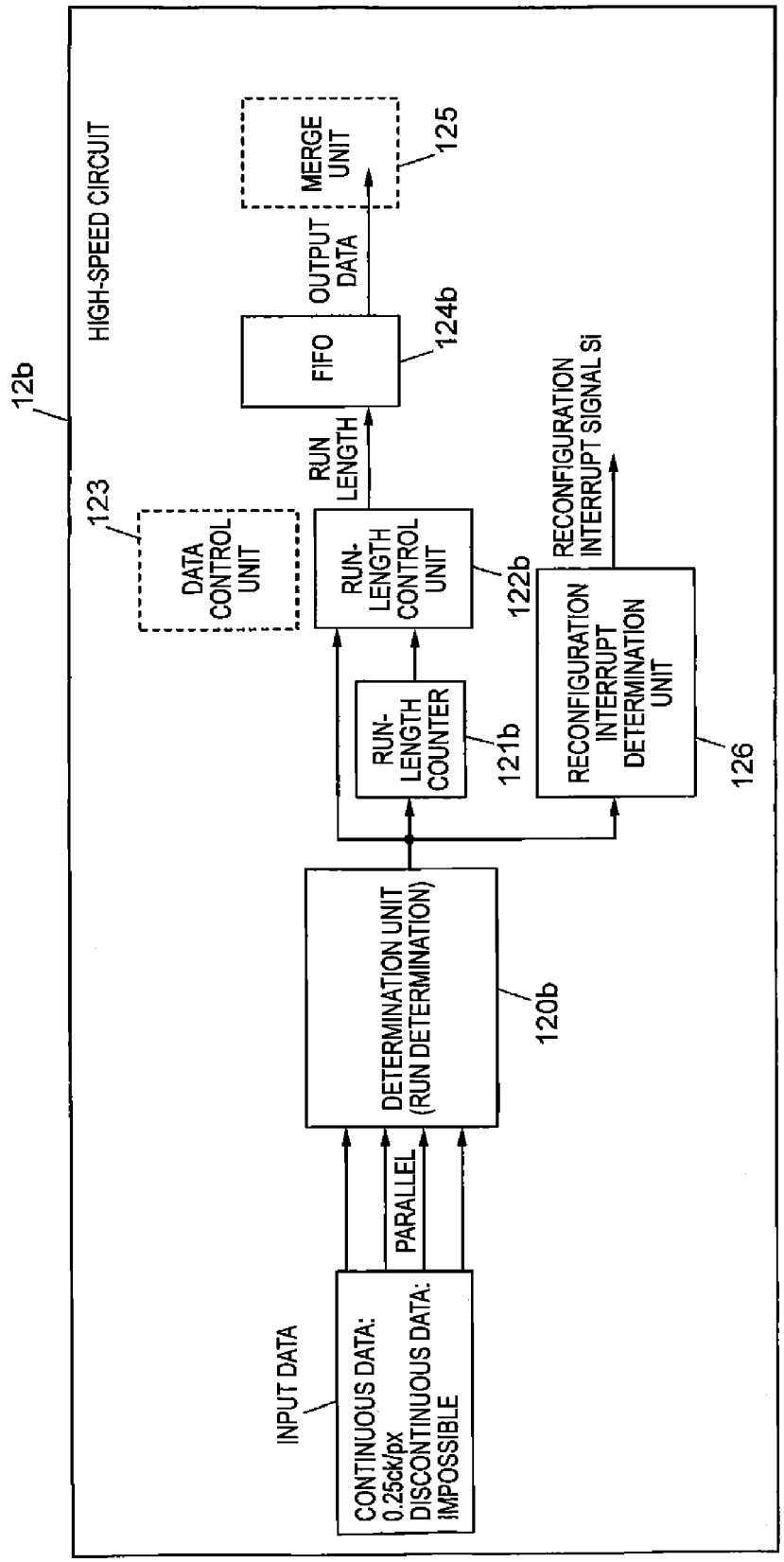
FIG. 4 is a block diagram illustrating an example of the configuration of a high-speed circuit.

FIG. 4 is a block diagram illustrating an example of the configuration of a high-speed circuit. By loading the second configuration data 131 on the reconfigurable circuit 12, the reconfigurable circuit 12 is reconfigured into the high-speed circuit 12b as illustrated in FIG. 4.

The high-speed circuit 12b is a circuit that inputs the input data string as a plurality of (in this embodiment, 4) parallel data strings, and performs a run-length compression by performing a run determination with respect to the plurality of (4) data strings. The high-speed circuit 12b includes a determination unit 120b, a run-length counter 121b, a run-length control unit 122b, a FIFO unit 124b, and a reconfiguration interrupt determination unit 126. This high-speed circuit 12b is configured without using the data control unit 123 and the merge unit 125 used in the typical circuit 12a.

The determination unit 120b inputs the plurality of (in this embodiment, 4) parallel data strings by pixels, and determines whether a portion (run), in which data having the same value as that of the input data continues, exists. The number of parallel data strings determined by the determination unit 120b corresponds to the threshold value (4) that is used in the determination program 110.

The run-length counter 121b counts runs that are determined in parallel by the determination unit 120b, and outputs the run length that is the sum of counts.

The run-length control unit 122b is configured to maintain data in that the run just before its discontinuation continues when the run discontinues on the way (for example, the run length is smaller than 4) and reconfiguration occurs. The run-length counter 121b combines and outputs the output run length and the maintained data.

The FIFO unit 124b outputs data that is obtained by combining the run length and the data output from the run-length control unit 122b as sequential output data.

Figure 5:
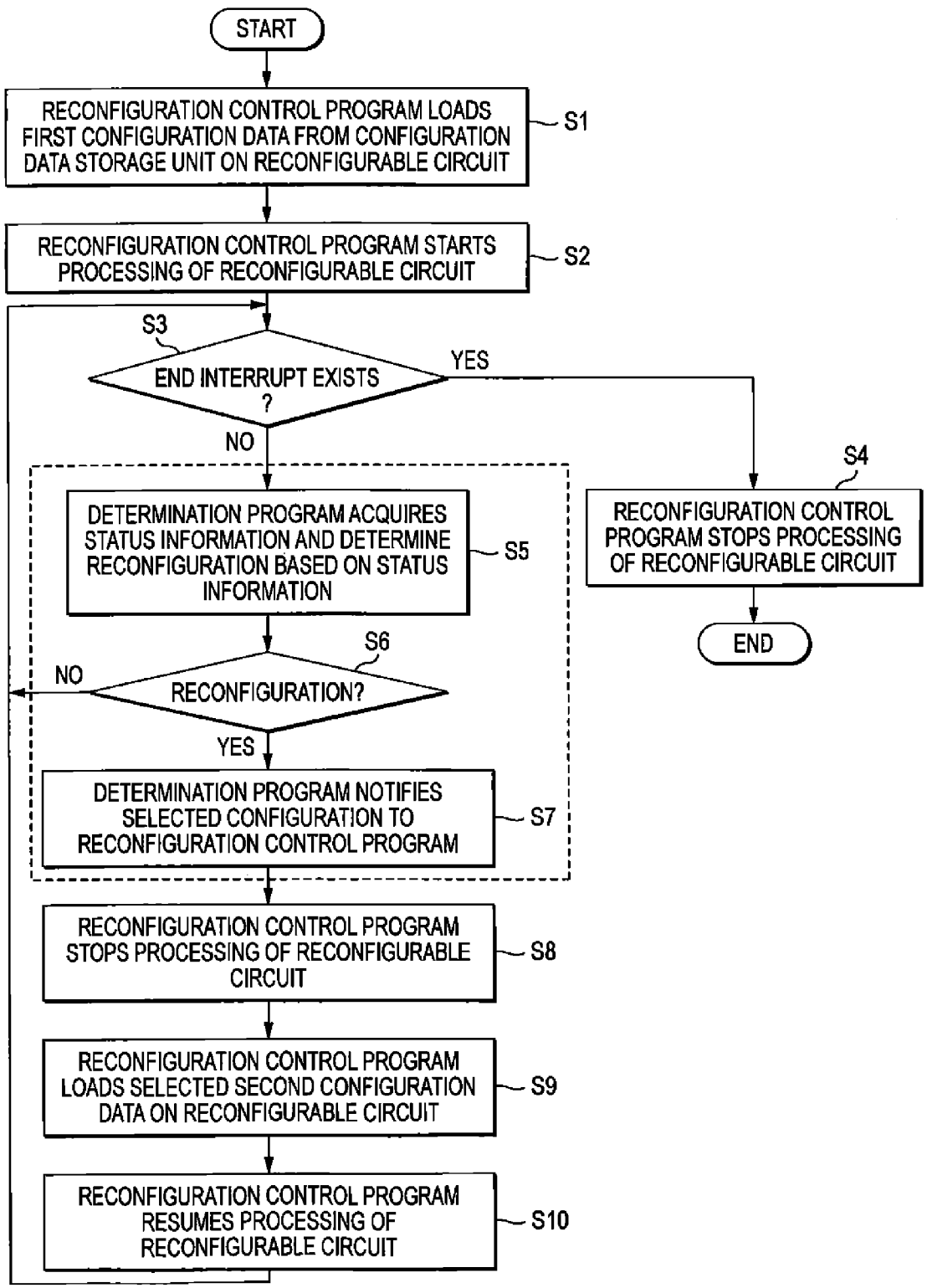
FIG. 5 is a flowchart illustrating an example of the whole operation of a reconfigurable operation apparatus.

FIG. 5 is a flowchart illustrating an example of the whole operation of a reconfigurable operation apparatus 10. A reconfiguration control program 111 loads the first configuration data 130 from the configuration data storage unit 13 on the reconfigurable circuit 12 (step S1). The reconfigurable circuit 12 is reconfigured into the typical circuit 12a as the first configuration data is loaded.

The reconfiguration control program 111 starts the processing of the reconfigurable circuit 12, that is, the typical circuit 12a (step S2).

The reconfiguration interrupt determination unit 126 determines whether there is an end interrupt (step S3), and if it is determined that the end interrupt exists (Yes in step S3), it outputs the end interrupt signal Si to the control unit 11.

The reconfiguration control program 111 stops the processing by the reconfigurable circuit 12 based on the end interrupt signal Si from the reconfiguration interrupt determination unit 126 (step S4).

In step S3, if the reconfiguration interrupt determination unit 126 determines that there is no end interrupt (No in step S3), the determination program 110 determines whether to perform the reconfiguration based on the status information from the reconfigurable circuit 12 since the end interrupt signal Si is not output from the reconfiguration interrupt determination unit 126 (step S6). If it is determined to perform the reconfiguration (Yes in step S6), the determination program 110 notifies the information of the selected high-speed circuit to the reconfiguration control program 111 (step S7).

The reconfiguration control program 111 stops the processing by the reconfigurable circuit 12 (step S8), and loads the second configuration data 131 for the selected high-speed circuit from the configuration data storage unit 13 onto the reconfigurable circuit 12 (step S9). The reconfigurable circuit 12 is reconfigured into the high-speed circuit 12b. The reconfiguration control program 111 resumes the processing by the reconfigurable circuit 12 (step S10).

Figure 6:
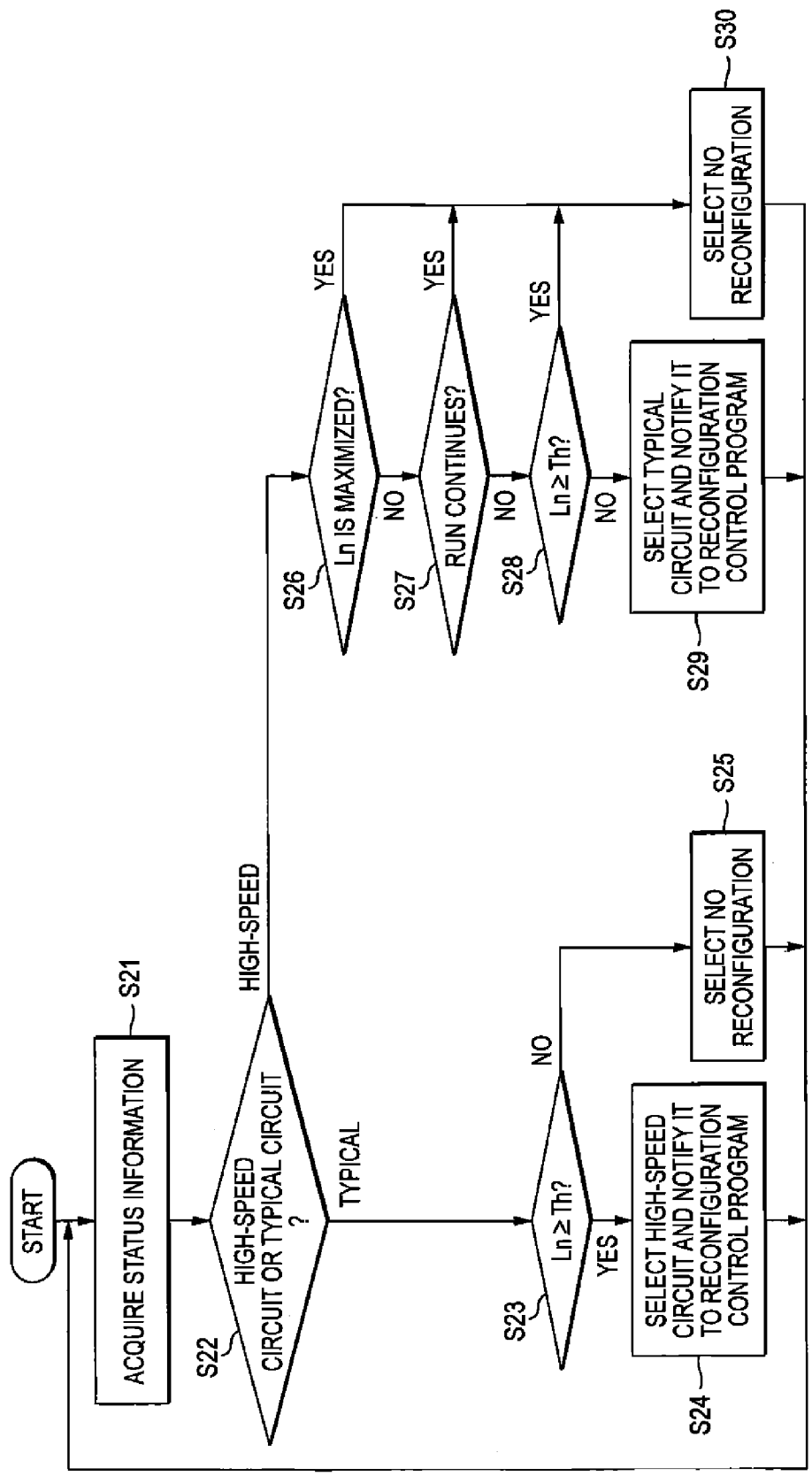
FIG. 6 is a flowchart illustrating an example of an example of an operation of a determination program.

FIG. 6 is a flowchart illustrating an example of the operation of the determination program 110. The same drawing illustrates the details of steps S5, S6, and S7 in FIG. 5.

The determination program 110 acquires the status information from the reconfigurable circuit 12 (step S21), and determines whether the current circuit is the typical circuit 12a or the high-speed circuit 12b from the status information (step S22). If the determination program 110 determines that the current circuit is the typical circuit 12a (step S22), it determines whether the run length Ln is equal to or larger than the threshold value Th (for example, 4) (step S23). If the run length Ln is equal to or larger than the threshold value Th (Yes in step S23), the determination program 110 selects the high-speed circuit 12b, and notifies that it has selected the high-speed circuit 12b to the reconfiguration control program 111 (step S24). If the run length Ln is smaller than the threshold value Th (No in step S23), the determination program 110 selects no reconfiguration (step S25).

In step S22, if it is determined that the current circuit is the high-speed circuit 12b (step S22), the determination program 110 determines whether the run length Ln is the maximum run length, which can be compressed in a general run-length compression (step S26). If the run length Ln is not the maximum run length (No in step S26), the determination program 110 determines whether the run continues (step S27), and if the run does not continue (No in step S27), the determination program 110 determines whether the run length Ln is equal to or larger than the threshold value Th (step S28). If the run length Ln is smaller than the threshold value Th (No in step S28), the determination program 110 selects the typical circuit 12a, and notifies that it has selected the typical circuit 12a to the reconfiguration control program 111 (step S29).

In the case where the run length becomes the maximum run length (Yes in step S26) in step S26, in the case where the run continues (Yes in step S27) in step S27, or in the case where the run length Ln is equal to or larger than the threshold value Th (Yes in step S28) in step S28, the determination program selects no reconfiguration (step S30).

FIGS. 7A to 7E illustrate detailed examples of a compression operation. In detail, FIG. 7A is a diagram illustrating an example of input data, FIG. 7B is a diagram illustrating a circuit that compresses the input data, FIG. 7C is a diagram illustrating an example of output data, FIG. 7D is a diagram schematically illustrating a typical circuit, and FIG. 7E is a diagram schematically illustrating a high-speed circuit.

Since the run length is smaller than the threshold value (4) in a section "AABCC" of the input data as illustrated in FIG. 7A, the reconfigurable circuit 12 is reconfigured into the typical circuit 12a to process the input data. As illustrated in FIG. 7D, the typical circuit 12a compresses the input data by determining the existence/nonexistence of runs for each pixel (px), and outputs output data "2AB2C".

In the next input data "DDDDD . . . DDDDD", the run length is equal to or larger than the threshold value (4), and the reconfigurable circuit 12 is reconfigured into the high-speed circuit 12b to process the input data. As illustrated in FIG. 7E, the high-speed circuit 12b performs a parallel processing of the input data, and outputs output data "256D 256D 120D".

In the next input data "A", the run length is smaller than the threshold value (4), and the reconfigurable circuit 12 is reconfigured into the typical circuit 12a to process the input data. The typical circuit 12a outputs the input data "A" as it is as output data "A".

In the next input data "BBBBB . . . BBBBB", the run length is equal to or larger than the threshold value (4), and the reconfigurable circuit 12 is reconfigured into the high-speed circuit 12b to process the input data. As illustrated in FIG. 7E, the high-speed circuit 12b performs a parallel processing of the input data, and outputs output data "256B 256B 200B".

In the next input data "CCCD", the run length is smaller than the threshold value (4), and the reconfigurable circuit 12 is reconfigured into the typical circuit 12a to process the input data. As illustrated in FIG. 7D, the typical circuit 12a compresses the input data "CCCD" and outputs output data "3CD".

FIGS. 8A to 8F are diagrams schematically illustrating examples of a reconfigurable circuit after reconfiguration according to a second embodiment of the invention. In FIGS. 8A to 8F, illustration of the run-length counter, data control unit, run-length control unit, and configuration interrupt determination unit is omitted.

In the first embodiment, it is exemplified that the input data is input through channel 1 (ch1), and in the second embodiment, it is exemplified that the input data is input through channel 1 (ch1) and channel 2 (ch2). The configuration data storage unit 13 stores configuration data for reconfiguring circuits as illustrated in FIGS. 8A to 8F to be described later.

Figure 8A:
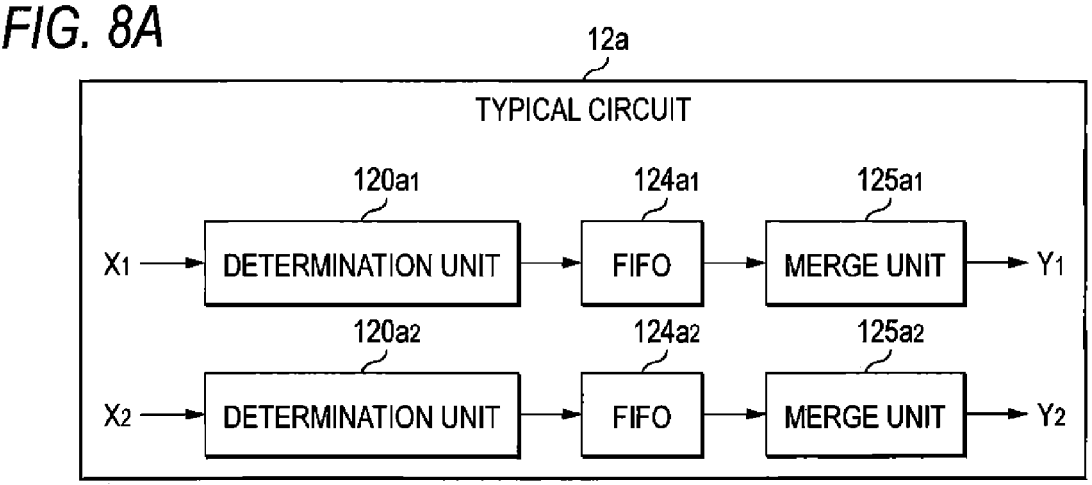
FIGS. 8A to 8C are diagrams illustrating an example of a reconfigurable circuit after reconfiguration according to a second embodiment of the invention.

In this embodiment, the typical circuit 12a, as illustrated in FIG. 8A, includes a determination unit $120a_1$ that processes input data $X_1$ as channel 1, a FIFO unit $124a_1$, a merge unit $125a_1$, a determination unit $120a_2$ that processes input data $X_2$ as channel 2, a FIFO unit $124a_2$, and a merge unit $125a_2$.

Figure 8B:
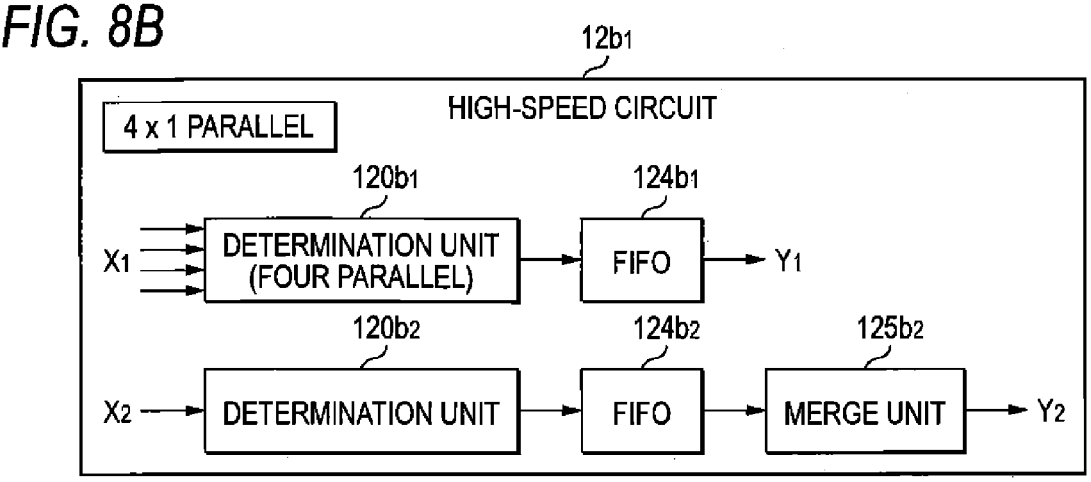

The 4×1 parallel high-speed circuit $12b_1$, as illustrated in FIG. 8B, includes a determination unit $120b_1$ that processes 4-string input data $X_1$ as channel 1, a FIFO unit $124b_1$, a determination unit $120b_2$ that processes one-string input data $X_2$ as channel 2, a FIFO unit $124b_2$, and a merge unit $125b_2$.

Figure 8C:
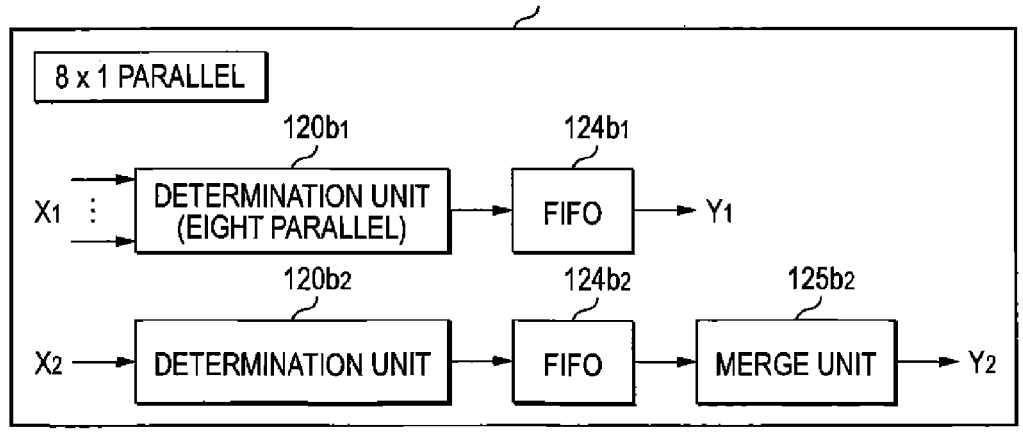

The 8×1 parallel high-speed circuit $12b_2$, as illustrated in FIG. 8C, includes a determination unit $120b_1$ that processes 8-string input data $X_1$ as channel 1, a FIFO unit $124b_1$, a determination unit $120b_2$ that processes one-string input data $X_2$ as channel 2, a FIFO unit $124b_2$, and a merge unit $125b_2$.

Figure 8D:
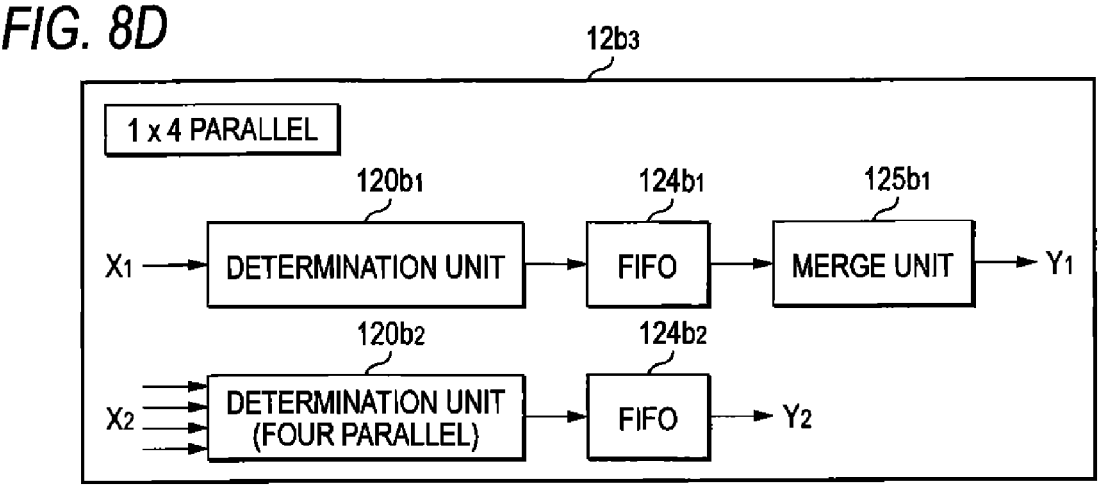
FIGS. 8D to 8F are diagrams illustrating an example of a reconfigurable circuit after reconfiguration according to a second embodiment of the invention.

The 1×4 parallel high-speed circuit $12b_1$, as illustrated in FIG. 8D, includes a determination unit $120b_1$ that processes one-string input data $X_1$ as channel 1, a FIFO unit $124b_1$, a merge unit $125b_1$, a determination unit $120b_2$ that processes 4-string input data $X_2$ as channel 2, and a FIFO unit $124b_2$.

Figure 8E:
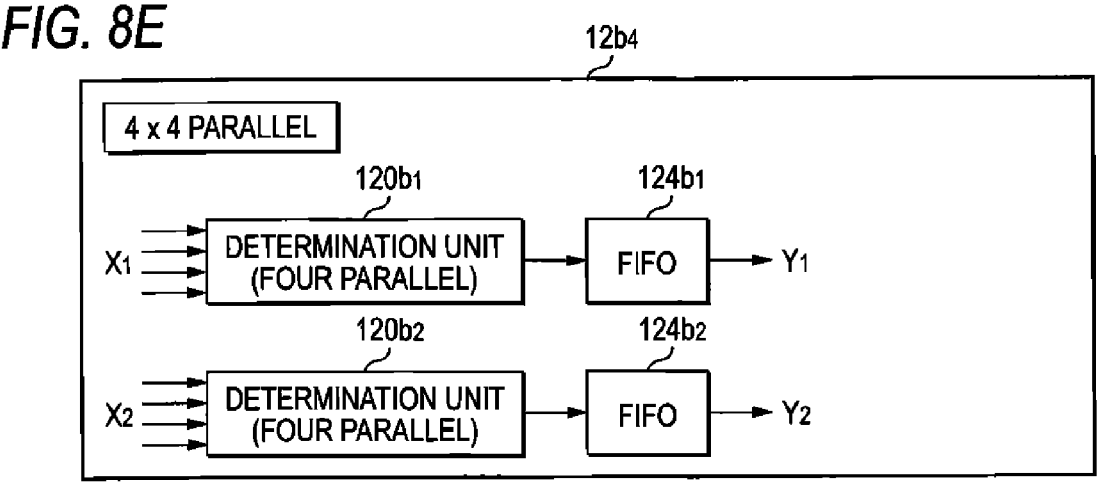

The 4×4 parallel high-speed circuit $12b_1$, as illustrated in FIG. 8E, includes a determination unit $120b_1$ that processes 4-string input data $X_1$ as channel 1, a FIFO unit $124b_1$, a determination unit $120b_2$ that processes 4-string input data $X_2$ as channel 2, and a FIFO unit $124b_2$.

Figure 8F:
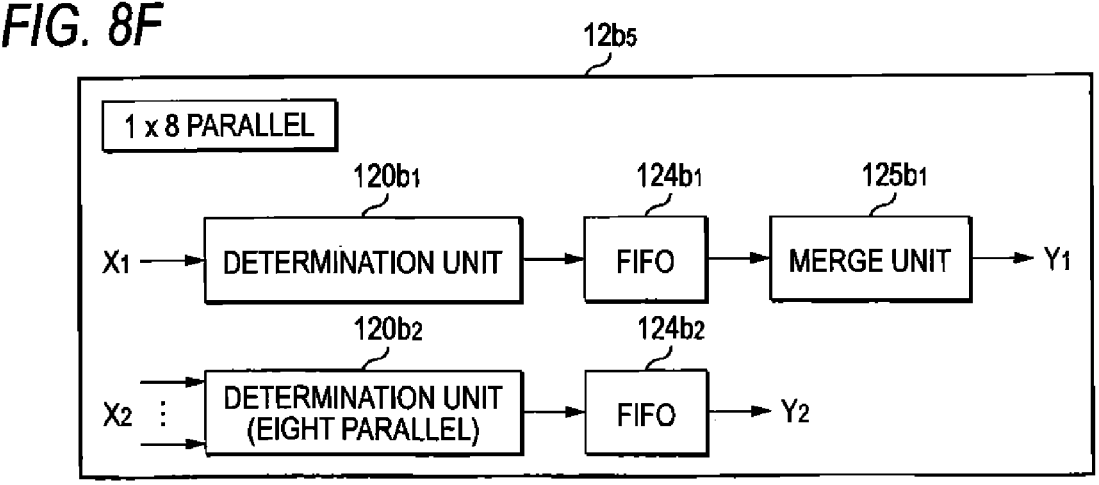

The 1×8 parallel high-speed circuit $12b_2$, as illustrated in FIG. 8F, includes a determination unit $120b_1$ that processes one-string input data $X_1$ as channel 1, a FIFO unit $124b_1$, a merge unit $125b_1$, a determination unit $120b_2$ that processes 8-string input data $X_2$ as channel 2, and a FIFO unit $124b_2$.

Figure 9:
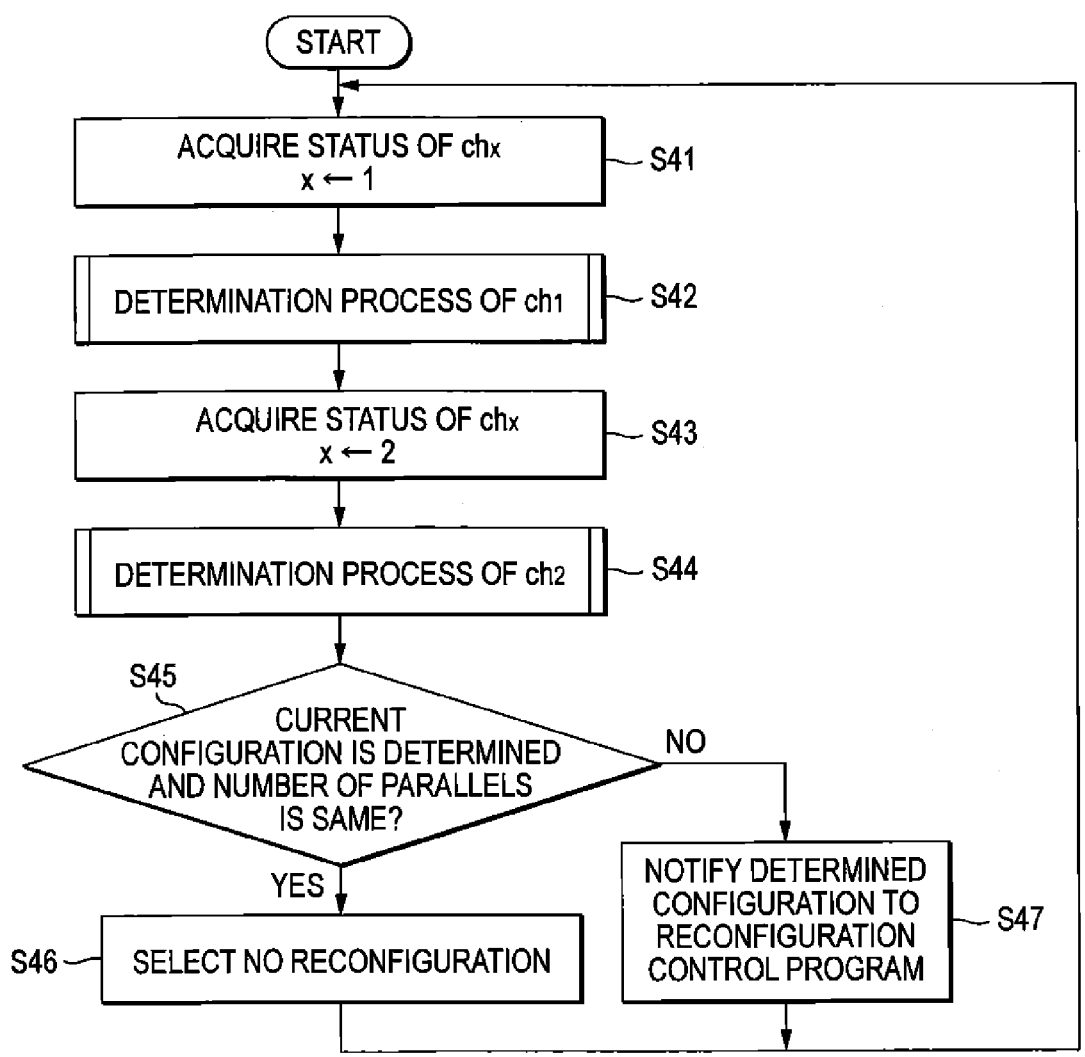
FIG. 9 is a flowchart illustrating an example of an operation of a second embodiment of the invention.

FIGS. 9 and 10 are flowcharts illustrating an example of an operation of a second embodiment of the invention.

A determination processing is performed with respect to channel (ch) 1 (step S42) by acquiring status information of ch1 (step S41), and a determination processing is performed with respect to channel (ch) 2 (step S44) by acquiring status information of ch2 (step S43).

The current configuration is determined, and it is determined whether the number of parallel data strings is equal to the current state (step S45). If the number of parallel data strings is equal to the current state (Yes in step S45), no reconfiguration is selected (step S46). If the number of parallel data strings is different from the current state (No in step S45), the determined configuration is notified to the reconfiguration control program 111 (step S47).

In steps S42 and S44, the processing as illustrate in FIG. 10 is performed. Hereinafter, the determination processing will be described with reference to FIG. 10.

It is determined whether the run discontinues on the way (step S51), and if the run does not discontinue on the way (No in step S51), the number of parallel data strings in channel x is determined (step S52).

If the number of parallel data strings in channel x is "1", it is determined whether the run length Ln is equal to or larger than the threshold value Th(4) and whether there is an empty portion in resources (step S53). If the run length Ln is equal to or larger than the threshold value Th and there is an empty portion in resources (Yes in step S53), the number of parallel data strings is set to "4" (step S54), while if the run length Ln is smaller than the threshold value Th or if there is no empty portion in resources even though the run length Ln is equal to or larger than the threshold value Th (No in step S53), the number of parallel data strings is set to "1" (step S55).

If the number of parallel data strings in channel x is "4", it is determined whether the run length Ln is equal to or larger than the threshold value Th×2 and whether there is an empty portion in resources (step S56). If the run length Ln is equal to or larger than the threshold value Th×2 and there is an empty portion in resources (Yes in step S56), the number of parallel data strings a is set to "8" (step S57), while if the run length Ln is smaller than the threshold value Th×2 or if there is no empty portion in resources even though the run length Ln is equal to or larger than the threshold value Th×2 (No in step S56), the number of parallel data strings a is set to "1" (step S58).

If the number of parallel data strings in channel x is "8", it is determined whether the run length Ln is equal to or larger than the threshold value Th×2 and whether there is an empty portion in resources (step S59). If the run length Ln is equal to or larger than the threshold value Th×2 and there is an empty portion in resources (Yes in step S59), the number of parallel data strings a is set to "8" (step S60), while if the run length Ln is smaller than the threshold value Th×2 or if there is no empty portion in resources even though the run length Ln is equal to or larger than the threshold value Th×2 (No in step S59), the number of parallel data strings a is set to "1" (step S61).

In the second embodiment, although the number of channels is set to "2", it may be set to "3" or more.

The present invention is not limited to the above-described embodiments, and diverse modifications thereof are possible without departing from the scope of the invention. For example, the program used in the above-described embodiments may be stored and provided in a recording medium such as a CD-ROM or the like. Also, all portions or a portion of respective means according to the above-described embodiments may be implemented by hardware such as ASIC or the like. Also, alteration, deletion, addition, and the like, of the steps as described in the above-described embodiments are possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reconfigurable operation apparatus comprising:
a reconfigurable circuit that has a plurality of small circuits and that reconfigures a circuit using a small circuit selected from the plurality of small circuits based on recorded circuit information;
a storage unit that stores first and second circuit information which corresponds to first and second compression circuits, respectively, each of the first and second compression circuits include first and second channels for inputting an input data string;
the first compression circuit is a circuit which performs a run-length compression of the input data string;
the second compression circuit is a circuit (i) which inputs the input data string as a plurality of parallel data strings, (ii) which performs a run determination with respect to the plurality of parallel data strings, and (iii) which performs a run-length compression based on the run determination; and
a control unit that (i) reconfigures the reconfigurable circuit into the first or second compression circuit by recording the first or second circuit information in the reconfigurable circuit in accordance with a run length of the input data string; and (ii) determines a number of parallel data strings input to the first and second channels of the second compression circuit in accordance with the run length of the input data string and an empty status of a usable small circuit, and records the second circuit information corresponding to the determined number of parallel data strings in the reconfigurable circuit.

2. A reconfigurable operation method for a reconfigurable operation apparatus which includes a reconfigurable circuit having a plurality of small circuits and reconfiguring a circuit using a small circuit selected from the plurality of small circuits based on recorded circuit information, and a storage unit storing first and second circuit information which corresponds to first and second compression circuits, respectively, each of the first and second compression circuits include first and second channels for inputting an input data string, the first compression circuit is a circuit which performs a run-length compression of the input data string, and the second compression circuit is a circuit (i) which inputs the input data string as a plurality of parallel data strings, (ii) which performs a run determination with respect to the plurality of parallel data strings, and (iii) which performs a run-length compression based on the run determination, the operation method comprising:
reconfiguring the reconfigurable circuit into the first or second compression circuit by recording the first or second circuit information in the reconfigurable circuit in accordance with a run length of an input data string;

determining a number of parallel data strings input to the first and second channels of the second compression circuit in accordance with the run length of the input data string and an empty status of a usable small circuit; and recording the second circuit information corresponding to the determined number of parallel data strings in the reconfigurable circuit.

3. A non-transitory computer-readable medium storing a program that causes a computer to execute reconfigurable operation, the computer which includes a reconfigurable circuit having a plurality of small circuits and reconfiguring a circuit by using a small circuit selected from the plurality of small circuits based on recorded circuit information, and a storage unit storing first and second circuit information which corresponds to first and second compression circuits, respectively, each of the first and second compression circuits include first and second channels for inputting an input data string, the first compression circuit is a circuit which performs a run-length compression of the input data string, and the second compression circuit is a circuit (i) which inputs the input data string as a plurality of parallel data strings, (i) which performs a run determination with respect to the plurality of parallel data strings, and (iii) which performs a run-length compression based on the run determination, the reconfigurable operation comprising:

reconfiguring the reconfigurable circuit into the first or second compression circuit by recording the first or second circuit information in the reconfigurable circuit in accordance with a run length of the input data string;

determining a number of parallel data strings input to the first and second channels of the second compression circuit in accordance with the run length of the input data string and an empty status of a usable small circuit; and recording the second circuit information corresponding to the determined number of parallel data strings in the reconfigurable circuit.

* * * * *